United States Patent
Deng et al.

(10) Patent No.: US 12,215,038 B2
(45) Date of Patent: Feb. 4, 2025

(54) METHOD FOR PREPARING TWO-DIMENSIONAL ORDERED MESOPOROUS NANOSHEETS BY INORGANIC SALT INTERFACE-INDUCED ASSEMBLY

(71) Applicant: FUDAN UNIVERSITY, Shanghai (CN)

(72) Inventors: Yonghui Deng, Shanghai (CN); Liangliang Liu, Shanghai (CN); Yidong Zou, Shanghai (CN); Xuanyu Yang, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 616 days.

(21) Appl. No.: 17/603,587

(22) PCT Filed: Mar. 9, 2020

(86) PCT No.: PCT/CN2020/078361
§ 371 (c)(1),
(2) Date: Oct. 14, 2021

(87) PCT Pub. No.: WO2020/228400
PCT Pub. Date: Nov. 19, 2020

(65) Prior Publication Data
US 2022/0194811 A1    Jun. 23, 2022

(30) Foreign Application Priority Data

May 11, 2019   (CN) .......................... 201910391031.7

(51) Int. Cl.
*C01G 23/053* (2006.01)
*B32B 18/00* (2006.01)
(Continued)

(52) U.S. Cl.
CPC ............ *C01G 23/053* (2013.01); *B32B 18/00* (2013.01); *C01B 32/15* (2017.08); *C01B 33/113* (2013.01);
(Continued)

(58) Field of Classification Search
CPC ........ C01G 23/053–0538; C01B 32/15; C01B 32/182; C01B 32/188; C01B 33/113;
(Continued)

(56) References Cited

FOREIGN PATENT DOCUMENTS

| CN | 101823706 A | 9/2010 |
|----|-------------|--------|
| CN | 104538595 A * | 4/2015 |

(Continued)

OTHER PUBLICATIONS

Deng, Y., Resol Assisted Synthetic Large Aperture Ordered Mesopore Metallic Oxide Material, Dec. 9, 2015, see machine translation of CN 105129856 (Year: 2015).*

(Continued)

*Primary Examiner* — Matthew E. Hoban
(74) *Attorney, Agent, or Firm* — Bayramoglu Law Offices LLC

(57) ABSTRACT

A method for preparing two-dimensional (2D) ordered mesoporous nanosheets by inorganic salt interface-induced assembly includes the following steps: carrying out, by using a soluble inorganic salt as a substrate and an amphiphilic block copolymer as a template, uniform mass diffusion of a target precursor solution at an inorganic salt crystal interface through vacuum filtration or low-speed centrifugation; forming a single-layer ordered mesoporous structure by using the solvent evaporation-induced co-assembly (EICA) technology; and promoting, through gradient temperature-controlled Ostwald ripening, the evaporation and induced formation of an organic solvent, and removing the template in $N_2$ to obtain a 2D single-layer ordered mesoporous nanosheet material. The assembled nanosheet material has a large pore size, regular spherical pores and orderly arrangement. By changing the type of the precursor, a variety of mesoporous metal oxides, metal elements, inorganic non-metal nanosheets are synthesized.

9 Claims, 2 Drawing Sheets

(51) Int. Cl.

| | | |
|---|---|---|
| *C01B 32/15* | (2017.01) | |
| *C01B 33/113* | (2006.01) | |
| *C01F 7/30* | (2022.01) | |
| *C01F 17/235* | (2020.01) | |
| *C01F 17/32* | (2020.01) | |
| *C01G 25/02* | (2006.01) | |
| *B82Y 30/00* | (2011.01) | |
| *B82Y 40/00* | (2011.01) | |

(52) U.S. Cl.
CPC .............. *C01F 7/30* (2013.01); *C01F 17/235* (2020.01); *C01F 17/32* (2020.01); *C01G 25/02* (2013.01); *B82Y 30/00* (2013.01); *B82Y 40/00* (2013.01); *C01P 2004/01* (2013.01); *C01P 2004/24* (2013.01); *C01P 2006/16* (2013.01)

(58) Field of Classification Search
CPC ....... C01B 33/12; C01F 17/235; B32B 18/00; C01P 7/30
See application file for complete search history.

(56) References Cited

FOREIGN PATENT DOCUMENTS

| | | | |
|---|---|---|---|
| CN | 105129856 A | * | 12/2015 |
| CN | 105523538 A | | 4/2016 |
| CN | 110127661 A | | 8/2019 |

OTHER PUBLICATIONS

Sun, D., Lithium Ion Battery Cathode Material, Apr. 22, 2015, machine translation of CN 104538595 (Year: 2015).*
Lan. Uniform Ordered Two-Dimensional Mesoporous TiO 2 Nanosheets from Hydrothermal-Induced Solvent-Confined Monomicelle Assembly. J. Am. Chem. Soc. 2018, 140, 4135-4143 (Year: 2018).*
Liheng Wu, et al., High-temperature crystallization of nanocrystals into three-dimensional superlattices, Nature, 2017, vol. 548.
Hai-Wei Liang, et al., Mesoporous Metal-Nitrogen-Doped Carbon Electrocatalysts for Highly Efficient Oxygen Reduction Reaction, Journal of the American Chemical Society, 2013, pp. 16002-16005, 135.
Jian Zhang, et al., Efficient hydrogen production on MoNi4 electrocatalysts with fast water dissociation kinetics, Nature Communications, 2017, pp. 1-8, 8:15437.
Ziqi Sun, et al., Generalized self-assembly of scalable two-dimensional transition metal oxide nanosheets, Nature Communications, 2014, pp. 1-9, 5:3813.
Jianfeng Ping, et al., Recent Advances in Sensing Applications of Two-Dimensional Transition Metal Dichalcogenide Nanosheets and Their Composites, Adv. Funct. Mater., 2017, 1605817(1 of 18), 27.
Shubin Yang, et al., Exfoliated Graphitic Carbon Nitride Nanosheets as Efficient Catalysts for Hydrogen Evolution Under Visible Light, Adv. Mater., 2013, pp. 2452-2456.
Qiaoli Chen, et al., Excavated Cubic Platinum-Tin Alloy Nanocrystals Constructed from Ultrathin Nanosheets with Enhanced Electrocatalytic Activity, Angew. Chem. Int. Ed., 2016, pp. 9021-9025, 55.
Liangliang Liu, et al., A Universal Lab-on-Salt-Particle Approach to 2D Single-Layer Ordered, Mesoporous Materials, Adv. Mater., 2020, pp. 1906653 (1 of 9), vol. 32.

* cited by examiner

METHOD FOR PREPARING TWO-DIMENSIONAL ORDERED MESOPOROUS NANOSHEETS BY INORGANIC SALT INTERFACE-INDUCED ASSEMBLY

CROSS REFERENCE TO THE RELATED APPLICATIONS

This application is the national stage entry of International Application No. PCT/CN2020/078361, filed on Mar. 9, 2020, which is based upon and claims priority to Chinese Patent Application No. 201910391031.7 filed on May 11, 2019, the entire contents of which are incorporated herein by reference.

TECHNICAL FIELD

The present disclosure belongs to the technical field of nanoporous materials, and in particular relates to a method for preparing two-dimensional (2D) ordered mesoporous nanosheets by inorganic salt interface-induced assembly.

BACKGROUND

In recent years, with the rapid development of nanomaterials and nanotechnology, nanomaterials are widely used in catalysis, sensor, adsorption, electrochemistry, bioseparation, sustained drug release, etc. due to their unique size structure, stable physicochemical properties, and special microscopic effects (such as small size effect, quantum size effect, interface effect and macroscopic quantum tunneling effect) (L. Wu, J. J. Willis, I. S. McKay, B. T. Diroll, J. Qin, M. Cargnello, C. J. Tassone, *Nature.* 548, 197 (2017); H. W. Liang, W. Wei, Z. S. Wu, X. Feng, K. Mullen, *J. Am. Chem. Soc.* 135, 16002 (2013); J. Zhang, I. Wang, P. Liu, Z. Liao, S. Liu, X. Zhuang, M. Chen, E. Zschech, X. Feng, *Nat Conunun.* 8, 15437 (2017)), The optimization of the traditional synthesis technology and assembly method plays a vital role in the mass production and application of high-performance nanomaterials.

Nanosheet materials have high specific surface area, surface active sites and high reactivity due to their unique layered structure. In particular, single-layer ordered mesoporous nanosheet materials have gathered many performance advantages in terms of orderly pores, mesoporous aperture, single-layer morphology, nanoscale-size, etc., and have outstanding application prospects in nanocatalysis, capacitors, sensors, etc.

The reported and commonly used synthesis methods of nanosheet materials, especially for metal oxide nanosheet materials and mesoporous carbon nanosheet materials, including hydrothermal method, chemical etching method, vapor deposition method, etc. (Z. Sun, T. Liao, Y. Dou, S. M. Hwang, M. S. Park, L. Jiang, J. H. Kim, S. X. Dou, *Nat Commun.* 5, 1 (2014); J. Ping, Z. Fan, M. Sindoro, Y Ying, H. Zhang, Adv Fuller Mater 27, 1605817 (2017); S. Yang, Y. Gong, J. Zhang, L. Zhan , L. Ma, Z. Fang, R. Vajtai, X. Wang, P. M. Ajayan *Adv. Mater* 25, 2452 (2013); Q. Chen, Y. Yang, Z. Cao, Q. Kuang, G. Du, Y Jiang, Z. Xie, L. Zheng, *Angew. Chem.* 128, 9167 (2016).) Generally, these methods have defects such as time-consuming processes, complicated operations and high-cost. Meanwhile, the prepared 2D nanosheet material has defects such as irregular pores, non-uniform size distribution, low degree of order and uncontrolled thickness of the nanolayer. Therefore, these methods cannot be applied to the wide production and application of nanosheet materials, and cannot be adapted to the preparation of mesoporous nanosheet materials from various raw materials. For this reason, it is very important to propose a simple, efficient and universally synthesis method for controllable single-layer nanosheet.

Although domestic and international scholars have successfully synthesized a variety of highly ordered mesoporous nanomaterials with diverse morphology, unique structure and excellent performance by using the solvent evaporation-induced self-assembly (EISA) technology, they mainly concentrate on bulk, rod-like and linear nanomaterials. The method of synthesizing an ordered mesoporous material by using an inorganic salt as the substrate has not been reported yet. In addition, the solvent evaporation-induced co-assembly (FICA) technology is rarely involved in the assembly of 2D single-layer nanosheets, and it is hard to achieve the assembly and modification of single-layer nanosheets.

SUMMARY

An objective of the present disclosure is to provide a method for preparing two-dimensional (2D) ordered mesoporous nanosheets on a large scale by inorganic salt interface-induced assembly.

The method for preparing 2D ordered mesoporous nanosheets by inorganic salt interface-induced assembly provided by the present disclosure includes the following steps:

(1) preparing a nanomaterial precursor solution in a certain ratio by using an amphiphilic block copolymer with a high molecular weight as a template;

(2) introducing the prepared precursor solution into a soluble inorganic salt serving as a substrate; guiding, by a physical means of suction filtration (<0.03 MPa) or low-speed centrifugation (<4,000 rpm), mass diffusion of the precursor solution in the inorganic salt, to realize a single-layer dispersion interface on a surface of the precursor solution;

(3) regulating, based on a principle of solvent evaporation-induced co-assembly (FICA), slow or medium-speed evaporation of a volatile organic solvent in a gradient temperature-controlled manner, to realize the self-assembly of a molecular precursor and the copolymer on a surface of the inorganic salt;

(4) heating up to 300-600° C. at a rate of 1-5° C./min in $N_2$; carrying out high-temperature calcination for 2-3 h to remove the block copolymer template to obtain a layered 2D ordered mesoporous organic/inorganic hybrid composite; heating up to 430-630° C. at a rate of 1-5° C./min in air in a muffle furnace; carrying out high-temperature calcination for 2-3 h to remove residual carbon and obtain a highly ordered mesoporous structure; dissolving the inorganic salt substrate with a large amount of deionized water to obtain a 2D single-layer ordered mesoporous nanosheet material.

In the 2D ordered mesoporous nanosheet material prepared by the present disclosure, a mesoporous size is changeable, where the molecular weight of the copolymer is adjustable within 18-50 nm, and the number of nanosheet layers is adjusted to 1-5 by changing the solubility of the precursor, the suction filtration time or the centrifugation speed.

In the present disclosure, the amphiphilic block copolymer is a high-molecular-weight polymer, which may be one or more of the group consisting of a commercial polyether template (such as F127), PEO-b-PS, PEO-PPO-PEO and PS-b-P4VP.

In the present disclosure, a target nanosheet raw material used is one or more of the group consisting of metal alkoxide, metal chloride, metal sulfate, acetylacetonate, inorganic non-metal precursor salt and phenolic formaldehyde resin; the volatile organic solvent used by the precursor solution is one or more of the group consisting of tetrahydrofuran (THF) and ethanol.

In the present disclosure, the soluble inorganic salt used is a water-soluble salt such as NaCl, KCl or $K_2SO_4$.

In the present disclosure, when the volatile organic solvent is regulated in a gradient temperature-controlled manner, the solvent is gradiently and continuously evaporated at room temperature for 12-24 h, 35-40° C. for 15-24 h and 95-105° C. for 15-24 h.

In the present disclosure, during high-temperature calcination, the heating rate is 1° C./min in $N_2$ and 1-5° C./min in air.

In this present disclosure, a solution-phase assembly system of the single-layer nanosheet material includes 5-20 wt % of the target nanosheet raw material, 1-5 wt % of the block copolymer, 20-80 wt % of the inorganic salt, and the balance being the solvent. The synthesis of single-layer $SiO_2$, $Al_2O_3$ and $ZrO_2$ nanosheets requires the introduction of a small amount of acid solvent (such as hydrochloric acid and nitric acid) to adjust the hydrolysis rate.

In the present disclosure, the synthesized nanosheet material may have a variety of different morphologies (such as sheet-layered, layer-layered, bulk or amorphous), an adjustable size, an adjustable thickness and different materials.

The present disclosure adopts a simple two-phase system (THF/ethanol/water-O/W) and a metal or non-metal raw material with regular morphology and high stability. The surface enrichment-polymerization-reaction is carried out under the induction of the amphiphilic bloCk copolymer, and the precursor solution nucleates and grows on the surface of the soluble inorganic salt to form a unit cell structure. Thanks to the stable binding of the soluble inorganic salt, the block copolymer and the metal/non-metal raw material, the physical means such as suction filtration or slow centrifugation can be used to achieve the single-layer distribution of the precursor solution on the surface of the inorganic salt. Therefore, the present disclosure can easily produce a nanosheet material with a controllable thickness and an adjustable number of layers on the surface of the inorganic salt, and further promotes the slow nucleation and growth of the precursor on the surface of the inorganic salt by using the solvent evaporation-induced self-assembly (EISA) technology. In the present disclosure, the template is removed by high-temperature calcination, and the inorganic salt substrate is removed by using a water dissolving method. The present disclosure can be applied to the synthesis of 2D ordered mesoporous nanosheet materials of different materials (non-metals or metals and oxides and chlorides thereof) and different morphologies (sheet-layered, layer-layered, bulk or amorphous).

In the present disclosure, the synthesized nanosheet material is adjustable in the number of layers (between a single layer and multiple layers), controllable in the thickness of the pore wall, and less dependent on the raw material ratio. Therefore, it has desirable water dispersibility and ethanol dispersibility, hydrophilicity, and high-temperature resistance, and will not collapse after calcination due to the support of the inorganic salt. The 2D single-layer ordered mesoporous nanosheet material of the present disclosure has simple assembly, high efficiency and convenience, high controllability, highly ordered pores, adjustable pore size, and universal applicability to nanometer raw materials. The present disclosure is suitable for large-scale production, can be used to guide the synthesis of similar materials, and has important application value in nanocatalysis, sensing, adsorption and electrochemistry.

Compared with the traditional synthesis method, the present disclosure reduces the dependence of the nanosheet material on the raw material ratio, achieves highly ordered pores and adjustable pore size of the nanosheet material, avoids the collapse of the pores caused by high-temperature calcination, plays a vital role of the inorganic salt, and fully demonstrates the protective effect of the macro-micron material in the synthesis of the micro-nano material.

DETAILED DESCRIPTION OF THE EMBODIMENTS

Figure 1:
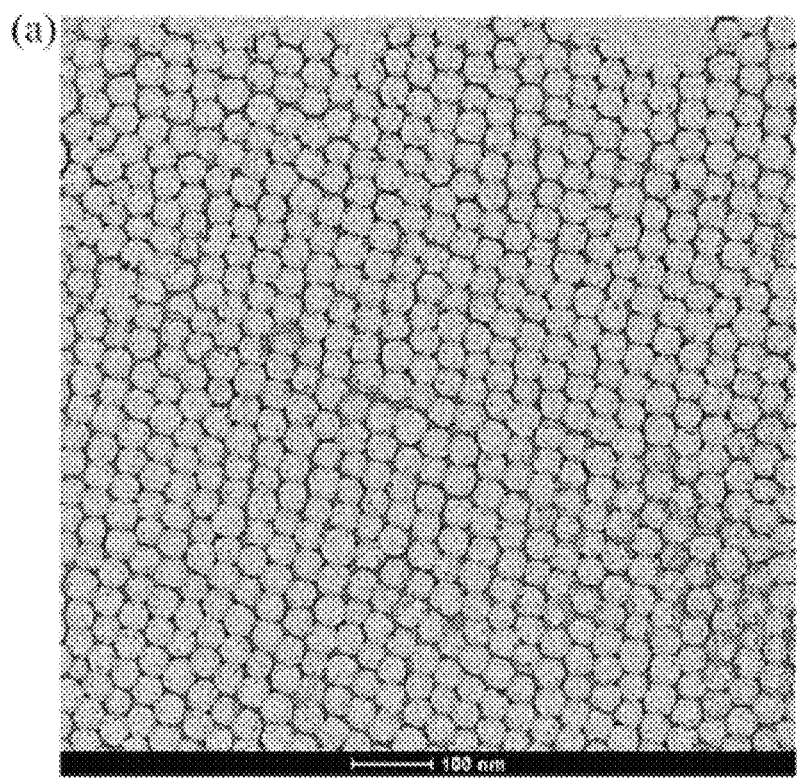
FIG. 1: Single-layer ordered mesoporous $TiO_2$ nanosheet calcinated at 350° C. in $N_2$, with a scale bar of 100 nm
Figure 2:
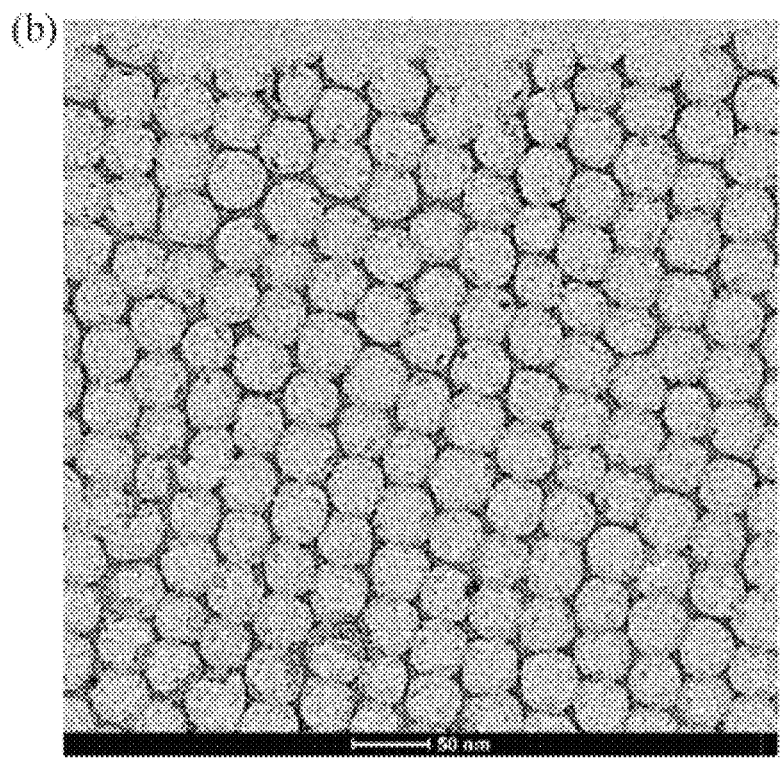
FIG. 2: Single-layer ordered mesoporous $TiO_2$ nanosheet calcinated at 350° C. in $N_2$, with a scale bar of 50 nm
Figure 3:
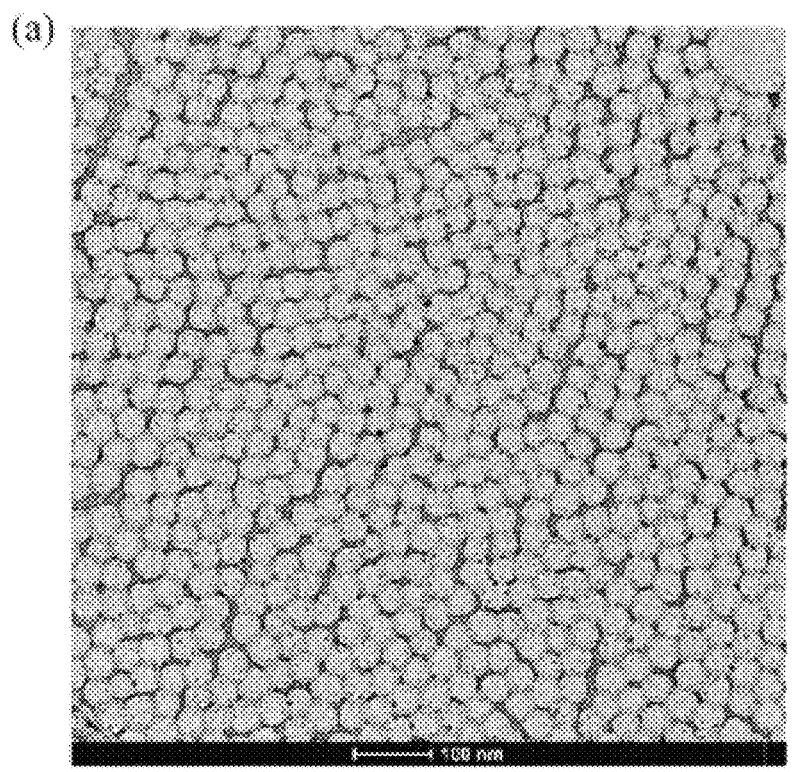
FIG. 3: Single-layer ordered mesoporous $TiO_2$ nanosheet calcinated at 430° C. in air, with a scale bar of 100 nm
Figure 4:
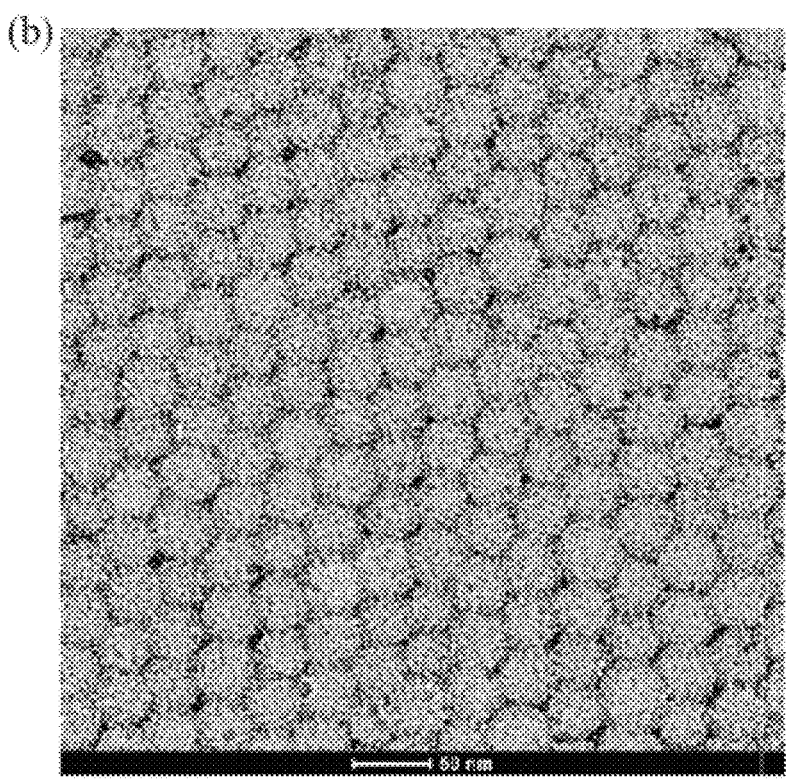
FIG. 4: Single-layer ordered mesoporous $TiO_2$ nanosheet calcinated at 430° C. in air, with a scale bar of 50 nm

The technical solutions of the present disclosure are described below with reference to the specific examples, but the protection scope of the present disclosure is not limited thereto. The present disclosure first prepares precursor solutions of different raw materials, and then assembles the precursor solution on the surface of an inorganic salt under the induction of a volatile solvent. The present disclosure is described in further detail below.

EXAMPLE 1

$PEO_{117}$-b-$PS_{113}$ (molecular weight 16,700 g·mol$^{-1}$, 0.1 g) was dissolved and dispersed into 10.0 g of a tetrahydrofuran (THF) solution, and 2.0 g of a THF-soluble phenolic formaldehyde resin precursor (20 wt %, including 0.25 g of phenol and 0.15 g of fortnaldehyde) was added. Magnetic stirring was continued for 0.5 h at room temperature to generate a uniform transparent solution. A certain amount of mixed solution was added into a solid crystal powder of inorganic salt NaCl. Lower than 0.03 MPa/30-120 s suction filtration (or 3,000 rpm/3 min centrifugation) was carried out. A small amount of precursor solution was attached to a NaCl crystal surface. A yielded solid was placed in a jar to evaporate the solvent at room temperature for 12 h. Then the solvent was transferred to an oven at 35° C. to continuously evaporate for 15 h. The temperature was adjusted to 100° C. to continuously evaporate for 15 h. The solid was taken out and calcinated in a tube furnace at 300° C. in $N_2$ for 3 h at a heating rate of 1° C./min so as to decompose the template. A resulting product was cooled, and washed 3-5 times with deionized water to remove the NaCl template, thereby obtaining a two-dimensional (2D) single-layer ordered mesoporous polymer nanosheet with a pore size of 27 nm. If the solid was calcinated in a tube furnace at 600° C. in $N_2$ for 3 h at a heating rate of 1° C./min, the finally obtained 2D single-layer ordered mesoporous carbon nanosheet had a pore size of 23 nm.

EXAMPLE 2

$PEO_{117}$-h-$PS_{113}$ (molecular weight 16,700 g·mol$^{-1}$, or F127) and tetrabutyl titanate (TROT, 0.2 g) were dissolved and dispersed into 10 mL of a THF solution. Concentrated hydrochloric acid (0.1 mL, 37%) and acetic acid (0.1 mL, 98%) were added. Magnetic stirring was continued for 0.5 h at room temperature. A certain amount of mixed solution was added into a solid crystal powder of inorganic salt NaCl. Lower than 0.03 MPa/30-120 s suction filtration (or 3,000 rpm/3 min centrifugation) was carried out. A small amount of precursor solution was attached to a NaCl crystal surface. A yielded solid was placed in a jar to evaporate the solvent at room temperature for 15 h. Then the solvent was transferred to an oven at 40° C. to continuously evaporate for 18 h. The temperature was adjusted to 105° C. to continuously evaporate for 24 h. The solid was taken out and calcinated in a tube furnace at 350° C. in $N_2$ for 2 h at a heating rate of 1° C./min so as to decompose the template. The solid was taken out and calcinated in a muffle furnace at 430° C. for 2 h at a heating rate of 1° C./min. A resulting product was cooled, and washed 3-5 times with deionized water to remove the NaCl template, thereby obtaining a 2D single-layer ordered mesoporous nanosheet $TiO_2$ with a pore size of 18 nm.

EXAMPLE 3

$PEO_{117}$-h-$PS_{113}$ (molecular weight 16,700 g·mol$^{-1}$, 40 mg) and ethyl orthosilicate (TEOS, 0.2 g) were dissolved and dispersed into 4.0 g of a THF solution. 0.1 M hydrochloric acid (0.06 g) was added. Magnetic stirring was continued for 0.5 h at room temperature to generate a uniform solution. A certain amount of mixed solution was added into a solid crystal powder of inorganic salt NaCl. Lower than 0.03 MPa/30-120 s suction filtration (or 3,000 rpm/3 min centrifugation) was carried out. A small amount of precursor solution was attached to a NaCl crystal surface. A yielded solid was placed in a jar to evaporate the solvent at room temperature for 18 h. Then the solvent was transferred to an oven at 42° C. to continuously evaporate for 18 h. The temperature was adjusted to 95° C. to continuously evaporate for 20 h. The solid was taken out and calcinated in a tube furnace at 350° C. in $N_2$ for 3 h at a heating rate of 1° C./min so as to decompose the template. The solid was taken out and calcinated in a muffle furnace at 600° C. for 2 h at a heating rate of 1° C./min. A resulting product was cooled, and washed 3-5 times with deionized water to remove the NaCl template, thereby obtaining a 2D single-layer ordered mesoporous nanosheet $SiO_2$ with a pore size of 25 nm.

EXAMPLE 4

$PEO_{117}$-b-$PS_{113}$ (molecular weight 16,700 gmol$^{-1}$, 0.1 g) was dissolved and dispersed into 10.0 g of a tetrahydrofuran (THF) solution, and 0.5 g of aluminum acetylacetonate was added. Then concentrated nitric acid (0.17 mL) was added, and magnetic stirring was continued for 12 h at room temperature. A certain amount of mixed solution was added into a solid crystal powder of inorganic salt NaCl. Lower than 0.03 MPa/30-120 s suction filtration (or 3,000 rpm/3 min centrifugation) was carried out. A small amount of precursor solution was attached to a NaCl crystal surface. A yielded solid was placed in a jar to evaporate the solvent at room temperature for 20 h. Then the solvent was transferred to an oven at 45° C. to continuously evaporate for 22 h. The temperature was adjusted to 98° C. to continuously evaporate for 22 h. The solid was taken out and calcinated in a tube furnace at 400° C. in $N_2$ for 2 h at a heating rate of 3° C./min so as to decompose the template. A resulting product was cooled, and transferred to a muffle furnace to calcinate at 630° C. in air for 3 h at a rate of 1° C./min. The product was cooled, and washed 3-5 times with deionized water to remove the NaCl template, thereby obtaining a 2D single-layer ordered mesoporous nanosheet $Al_2O_3$.

EXAMPLE 5

$PEO_{117}$-b-$PS_{113}$ (molecular weight 16,700 gmol$^{-1}$, 0.1 g) was dissolved and dispersed into 10.0 g of a THF solution, and 0.3 g of zirconium acetylacetonate was added. 0.15 mL of concentrated hydrochloric acid was added, and magnetic stirring was continued for 8 h at room temperature. A certain amount of mixed solution was added into a solid crystal powder of inorganic salt NaCl. Lower than 0.03 MPa/30-120 s suction filtration (or 3,000 rpm/3 min centrifugation) was carried out. A small amount of precursor solution was attached to a NaCl crystal surface. A yielded solid was placed in a jar to evaporate the solvent at room temperature for 20 h. Then the solvent was transferred to an oven at 38° C. to continuously evaporate for 20 h. The temperature was adjusted to 102° C. to continuously evaporate for 24 h. The solid was taken out and calcinated in a tube furnace at 350° C. in $N_2$ for 3 h at a heating rate of 1° C./min so as to decompose the template. The solid was taken out and calcinated in a muffle furnace at 450° C. for 2 h at a heating rate of 5° C./min. A resulting product was cooled, and washed 3-5 times with deionized water to remove the NaCl template, thereby obtaining a 2D single-layer ordered mesoporous nanosheet $ZrO_2$.

EXAMPLE 6

$PEO_{117}$-b-$PS_{113}$ (molecular weight 16,700 g·mol$^{-1}$, 0.1 g) was dissolved and dispersed into 4 mL of an N,N-dimethylformamide/ethanol mixed solution. Then 0.15 g of zirconium acetylacetonate and 0.104 g of TBOT were added. Magnetic stirring was continued for 2 h at room temperature. A certain amount of mixed solution was added into a solid crystal powder of inorganic salt NaCl. Lower than 0.03 MPa/30-120 s suction filtration (or 3,000 rpm/3 min centrifugation) was carried out. A small amount of precursor solution was attached to a NaCl crystal surface. A yielded solid was placed in a jar to evaporate the solvent at room temperature for 24 h. Then the solvent was transferred to an oven at 40° C. to continuously evaporate for 24 h. The temperature was adjusted to 105° C. to continuously evaporate for 24 h. The solid was taken out and calcinated in a tube furnace at 350° C. in $N_2$ for 3 h at a heating rate of 1° C./min so as to decompose the template. A resulting product was cooled, and transferred to a muffle furnace to calcinate at 450° C. for 2 h at a heating rate of 1° C./min. A resulting product was cooled, and washed 3-5 times with deionized water to remove the NaCl template, thereby obtaining a 2.1) single-layer ordered mesoporous polymer nanosheet $ZrTiO_4$.

EXAMPLE 7

$PEO_{117}$-b-$PS_{113}$ (molecular weight 16,700 gmol$^{-1}$, 0.1 g) was dissolved and dispersed into 10.0 g of a THF solution, and 0.4 g of zirconium acetylacetonate and 0.4 g of $CeCl_3·6H_2O$ were added. Magnetic stirring was continued for 2 h at room temperature. A certain amount of mixed solution was added into a solid crystal powder of inorganic salt NaCl. Lower than 0.03 MPa/30-120 s suction filtration (or 3,000 rpm/3 min centrifugation) was carried out. A small amount of precursor solution was attached to a NaCl crystal surface. A yielded solid was placed in a jar to evaporate the solvent at room temperature for 24 h. Then the solvent was transferred to an oven at 35° C. to continuously evaporate for 24 h. The temperature was adjusted to 95° C. to continuously evaporate for 24 h. The solid was taken out and calcinated in a tube furnace at 350° C. in $N_2$ for 3 h at a heating rate of 1° C./min so as to decompose the template. A resulting product was cooled, and transferred to a muffle furnace to calcinate at 450° C. in air for 2 h at a rate of 5° C./min. The product was cooled, and washed 3-5 times with deionized water to remove the NaCl template, thereby obtaining a 2D single-layer ordered mesoporous polymer nanosheet $Ce_{0.5}Zr_{0.5}O_2$.

EXAMPLE 8

A $CeO_2$ nanocrystal with a particle size of <5 nm was synthesized by pyrolysis, and the $CeO_2$ nanocrystal was subjected to surface hydrophilic treatment with 4-hydroxybenzoic acid to serve as a metal precursor, $PEO_{117}$-b-$PS_{113}$ (molecular weight 16,700 g·mol$^{-1}$, 20 mg) was dissolved and dispersed in 2.0 g of a THF solution. 40 mg of the modified $CeO_2$ nanocrystal was dispersed in 2.0 mL of an anhydrous ethanol solution. These solutions were mixed uniformly and stirred at room temperature for 2 h. A certain amount of mixed solution was added into a solid crystal powder of inorganic salt NaCl. Lower than 0.03 MPa/30-120 s suction filtration (or 3,000 rpm/3 min centrifugation) was carried out. A small amount of precursor solution was attached to a NaCl crystal surface. A yielded solid was placed in a jar to evaporate the solvent at room temperature for 20 h, Then the solvent was transferred to an oven at 40° C. to continuously evaporate for 24 h. The temperature was adjusted to 100° C. to continuously evaporate for 24 h. The solid was taken out and calcinated in a tube furnace at 350° C. in $N_2$ for 3 h at a heating rate of 1° C./min so as to decompose the template. The solid was taken out and calcinated in a muffle furnace at 450° C. for 2 h at a heating rate of 5° C./min. A resulting product was cooled, and washed 3-5 times with deionized water to remove the NaCl template, thereby obtaining a 2D single-layer ordered mesoporous nanosheet $CeO_2$ with a pore size of 27 nm. If the template was replaced with $PEO_{234}$-b-$PS_{266}$ with a higher molecular weight (molecular weight 39,000 g~mol–1, 20 mg), the finally obtained nanosheet had a pore size of 35 nm. If the template was replaced with $PEO_{468}$-b-$PS_{307}$ (molecular weight 51,000 g·mol$^{-1}$, 20 mg), the finally obtained nanosheet had a pore size of 48 nm.

The preferred specific examples of the present disclosure are described in detail above. It should be understood that a person of ordinary skill in the art can make various modifications and variations according to the concept of the present disclosure without creative efforts. Therefore, all technical solutions derived by those skilled in the art through logical analysis, reasoning or finite experiments based on the concept of the present disclosure should fall within the protection scope defined by the appended claims.

What is claimed is:

1. A method for preparing two-dimensional (2D) ordered mesoporous nanosheets by inorganic salt interface-induced assembly, comprising the following steps:
   (1) preparing a nanomaterial precursor solution by using an amphiphilic block copolymer as a template;
   (2) introducing the nanomaterial precursor solution into a soluble inorganic salt serving as a substrate; guiding mass diffusion of the nanomaterial precursor solution in the soluble inorganic salt by a physical means of suction filtration or low-speed centrifugation to realize a single-layer dispersion interface on a surface of the precursor solution, wherein the suction filtration is less than 0.03 MPa, and the low-speed centrifugation is less than 4,000 rpm;
   (3) based on a principle of solvent evaporation-induced co-assembly (EICA), regulating a volatile organic solvent to evaporate in a gradient temperature-controlled manner, to realize self-assembly of a molecular precursor and the amphiphilic block copolymer on a surface of the soluble inorganic salt;
   (4) heating up to 300-600° C. in $N_2$; carrying out calcination for 2-3 h to remove the amphiphilic block copolymer and to obtain a layered 2D ordered mesoporous organic/inorganic hybrid composite; heating up to 430-630° C. in air in a muffle furnace; carrying out calcination for 2-3 h to remove residual carbon and to obtain an ordered mesoporous structure;
   dissolving the soluble inorganic salt with an amount of deionized water to obtain a 2D single-layer ordered mesoporous nanosheet material.

2. The method according to claim 1, wherein the amphiphilic block copolymer is one or more selected from the group consisting of a commercial polyether template, PEO-b-PS, PEO-PPO-PEO and PS-b-P4VP;
   a nanosheet raw material used is one or more selected from the group consisting of metal alkoxide, metal chloride, metal sulfate, acetylacetonate, inorganic non-metal precursor salt and phenolic formaldehyde resin;
   the volatile organic solvent is one or more selected from the group consisting of tetrahydrofuran (THF) and ethanol.

3. The method according to claim 2, wherein the soluble inorganic salt used is selected from the group consisting of NaCl, KCl and $K_2SO_4$.

4. The method according to claim 1, wherein when the volatile organic solvent is regulated in the gradient temperature-controlled manner, the solvent is gradiently and continuously evaporated at room temperature for 12-24 h, at 35-40° C. for 15-24 h and at 95-105° C. for 15-24 h.

5. The method according to claim 4, wherein a heating rate of the calcination is 1-5° C./min.

6. The method according to claim 2, wherein a solution-phase assembly system of the 2D single-layer ordered mesoporous nanosheet material comprises 5-20 wt % of the nanosheet raw material, 1-5 wt % of the amphiphilic block copolymer, 20-80 wt % of the soluble inorganic salt, and the balance being the volatile organic solvent.

7. The method according to claim 2, wherein when the volatile organic solvent is regulated in the gradient temperature-controlled manner, the solvent is gradiently and continuously evaporated at room temperature for 12-24 h, at 35-40° C. for 15-24 h and at 95-105° C. for 15-24 h.

8. The method according to claim 3, wherein when the volatile organic solvent is regulated in the gradient temperature-controlled manner, the solvent is gradiently and continuously evaporated at room temperature for 12-24 h, at 35-40° C. for 15-24 h and at 95-105° C. for 15-24 h.

9. The method according to claim 4, wherein a solution-phase assembly system of the 2D single-layer ordered mesoporous nanosheet material comprises 5-20 wt % of a nanosheet raw material, 1-5 wt % of the amphiphilic block copolymer, 20-80 wt % of the soluble inorganic salt, and the balance being the volatile organic solvent.

* * * * *